(12) United States Patent
Fujiwaka

(10) Patent No.: US 10,248,462 B2
(45) Date of Patent: Apr. 2, 2019

(54) MANAGEMENT SERVER WHICH CONSTRUCTS A REQUEST LOAD MODEL FOR AN OBJECT SYSTEM, LOAD ESTIMATION METHOD THEREOF AND STORAGE MEDIUM FOR STORING PROGRAM

(71) Applicant: NEC Corporation, Tokyo (JP)

(72) Inventor: Masaya Fujiwaka, Tokyo (JP)

(73) Assignee: NEC Corporation, Tokyo (JP)

( * ) Notice: Subject to any disclaimer, the term of this patent is extended or adjusted under 35 U.S.C. 154(b) by 162 days.

(21) Appl. No.: 15/129,788

(22) PCT Filed: Mar. 20, 2015

(86) PCT No.: PCT/JP2015/001565
§ 371 (c)(1),
(2) Date: Sep. 27, 2016

(87) PCT Pub. No.: WO2015/146100
PCT Pub. Date: Oct. 1, 2015

(65) Prior Publication Data
US 2017/0132045 A1     May 11, 2017

(30) Foreign Application Priority Data
Mar. 28, 2014  (JP) ................. 2014-067602

(51) Int. Cl.
G06F 9/46    (2006.01)
G06F 9/50    (2006.01)
G06F 11/34   (2006.01)

(52) U.S. Cl.
CPC .......... *G06F 9/5027* (2013.01); *G06F 9/5083* (2013.01); *G06F 11/3447* (2013.01); *G06F 11/3433* (2013.01)

(58) Field of Classification Search
None
See application file for complete search history.

(56) References Cited

U.S. PATENT DOCUMENTS

2005/0138170 A1*  6/2005  Cherkasova .......... G06F 15/173
                                                      709/225
2013/0191107 A1   7/2013  Tonouchi

FOREIGN PATENT DOCUMENTS

JP    2006-024017 A    1/2006
JP    4952309 B2       6/2012
(Continued)

OTHER PUBLICATIONS

International Search Report issued by the Japan Patent Office as International Searching Authority for International Application No. PCT/JP2015/001565 dated May 12, 2015 (3 pages).

*Primary Examiner* — Wissam Rashid
(74) *Attorney, Agent, or Firm* — Wilmer Cutler Pickering Hale and Dorr LLP

(57) ABSTRACT

To efficiently construct a request load model that enables estimation of load information for a system on the basis of request information. A load estimation system comprising a management server that is connected to at least one object system, wherein
the management server comprises model generation means that generates a request load model in which load information for the object system is correlated with a classification of request into which request information for the object system is classified, and
the model generation means selects, in a process of the classification of the request information, the classification of request to be an object for sub-classification, based on estimation distribution information about the load information for each of the classification of request.

9 Claims, 11 Drawing Sheets

(56) References Cited

FOREIGN PATENT DOCUMENTS

| JP | 2014-041463 A | 3/2014 |
|---|---|---|
| WO | WO-2012/086444 A1 | 6/2012 |

\* cited by examiner

Fig. 3

| PERIOD | AVERAGE CPU UTILIZATION RATIO (%) | AVERAGE MEMORY USAGE (MB) |
|---|---|---|
| 8/20 0:00-0:15 | 80 | 1540 |
| 8/20 0:15-0:30 | 70 | 1000 |
| 8/20 0:30-0:45 | 50 | 1500 |
| 8/20 0:45-1:00 | 90 | 1800 |
| 8/20 1:00-1:15 | 30 | 1300 |

Fig. 4

| TIME | REQUEST | CLASSIFICATION |
|---|---|---|
| 8/20 0:01 | GET /func1/a.html | 1 |
| 8/20 0:02 | GET /func2/b.html | 1 |
| 8/20 0:05 | GET /func2/c.cgi | 1 |
| 8/20 1:05 | GET /func2/c.html | 1 |
| 8/20 1:10 | GET /func1/d.cgi | 1 |

| TIME | REQUEST | CLASSIFICATION |
|---|---|---|
| 8/20 0:01 | GET /func1/a.html | 1 |
| 8/20 0:02 | GET /func2/b.html | 2 |
| 8/20 0:05 | GET /func2/c.cgi | 2 |
| 8/20 1:05 | GET /func2/c.html | 2 |
| 8/20 1:10 | GET /func1/d.cgi | 1 |

$$\left.\begin{array}{l}U_1 = W_1 N_{11} + W_2 N_{12} \ldots W_q N_{1q}\\U_2 = W_1 N_{21} + W_2 N_{22} \ldots W_q N_{2q}\\\quad\vdots\\U_p = W_1 N_{p1} + W_2 N_{p2} \ldots W_q N_{pq}\end{array}\right\} \quad (1)$$

MANAGEMENT SERVER WHICH CONSTRUCTS A REQUEST LOAD MODEL FOR AN OBJECT SYSTEM, LOAD ESTIMATION METHOD THEREOF AND STORAGE MEDIUM FOR STORING PROGRAM

CROSS REFERENCE TO RELATED APPLICATIONS

This application is a national stage application of International Application No. PCT/JP2015/001565 entitled "LOAD ESTIMATION SYSTEM, INFORMATION PROCESSING DEVICE, LOAD ESTIMATION METHOD, AND STORAGE MEDIUM FOR STORING PROGRAM", filed on Mar. 20, 2015, which claims the benefit of the priority Japanese Patent Application No. 2014-067602 filed on Mar. 28, 2014, the disclosures of each of which are hereby incorporated by reference in their entirety.

TECHNICAL FIELD

The present invention relates to a load estimation system for estimating a load of an information processing device, an information processing device therefor, a load estimation method, and a program storage medium.

BACKGROUND ART

PTL 1 proposes a method in which request information is classified at keyword levels and a correlation between the classified information and load information for a computer system is used to model a relationship between the request information and the load information.

PTL 2 proposes a method for predicting a transition of a utilization ratio of a resource by a computer for a transaction. In the method, statistical time series analysis is performed on the basis of respective time series data for both information relating to a utilization ratio of a resource, such as a CPU and a memory in a computer, and information relating to a processing amount for each processing unit of a transaction.

CITATION LIST

Patent Literature

[PTL 1] Japanese Patent No. 4952309
[PTL 2] Japanese Unexamined Patent Application Publication No. 2006-024017

SUMMARY OF INVENTION

Technical Problem

The techniques used in the above PTLs have the following problem.

In PTL 1, in the case of evaluating whether or not information obtained by classifying request information at keyword levels is valid, a method of comparing classification methods in a brute-force manner is employed whereby classification methods with large influence and small influence on a load are compared. This has a problem that the evaluation is inefficient.

In PTL 2, a calculation formula for a resource utilization ratio (corresponding to "load information" in PTL 1) with respect to a transaction (corresponding to "request information" in PTL 1) is obtained using regression analysis. Consequently, it is exhaustive similarly to PTL 1 to evaluate validity in constituting each term of the calculation formula for each processing unit of a transaction, and thus, this also has a problem that the evaluation is inefficient.

As has been described above, PTLs 1 and 2 have a problem that a model for estimating load information for a system with respect to request information or a transaction cannot be efficiently generated.

An object of the present invention is to efficiently construct a request load model that enables estimation of load information for a system on the basis of request information.

Solution to Problem

A load estimation system according to an exemplary aspect of the invention includes:

a management server that is connected to at least one object system.

The management server comprises model generation means that generates a request load model in which load information for the object system is correlated with a classification of request into which request information for the object system is classified, and the model generation means selects, in a process of the classification of the request information, the classification of request to be an object for sub-classification, based on estimation distribution information about the load information for each of the classification of request.

An information processing device according to an exemplary aspect of the invention includes:

acquisition means that acquires a classification of request information from an external device and load information for the external device that corresponds to the request information; and generation means that generates a distribution of load information for each classification of request information, based on the acquired load information, wherein the generation means divides a classification of request information that corresponds to a distribution of load information in accordance with the distribution of load information.

An information processing method according to an exemplary aspect of the invention includes:

acquiring a classification of request information from an external device and load information for the external device that corresponds to the request information; and generating a distribution of load information for each classification of request information, based on the acquired load information, wherein in a process of the generation, a classification of request information that corresponds to a distribution of load information is divided in accordance with the distribution of load information.

A load estimation method according to an exemplary aspect of the invention includes: generating a request load model that correlates load information for an object system by using a classification of request into which request information for the object system is classified; and selecting, in a process of the classification of the request information, the classification of request to be an object for sub-classification, based on estimation distribution information about the load information for each of the classification of request.

A non-volatile recording medium according to an exemplary aspect of the invention stores a program that causes a computer to execute:

processing to generate a request load model that correlates load information for an object system by using a classification of request into which request information for the object system is classified; and processing to select, in a process of the classification of the request information, the classification of request to be an object for sub-classification, based on estimation distribution information about the load information for each of the classification of request.

Advantageous Effects of Invention

The present invention enables to efficiently construct a request load model that enables estimation of load information for a system on the basis of request information.

BRIEF DESCRIPTION OF DRAWINGS

FIG. 3 is a diagram illustrating an example of load information for an object system according to the first exemplary embodiment of the present invention.

FIG. 4 is a diagram illustrating an example of request information for an object system according to the first exemplary embodiment of the present invention.

DESCRIPTION OF EMBODIMENTS

<First Embodiment>

A first mode for carrying out the invention is described in detail with reference to the drawings.

Figure 1:
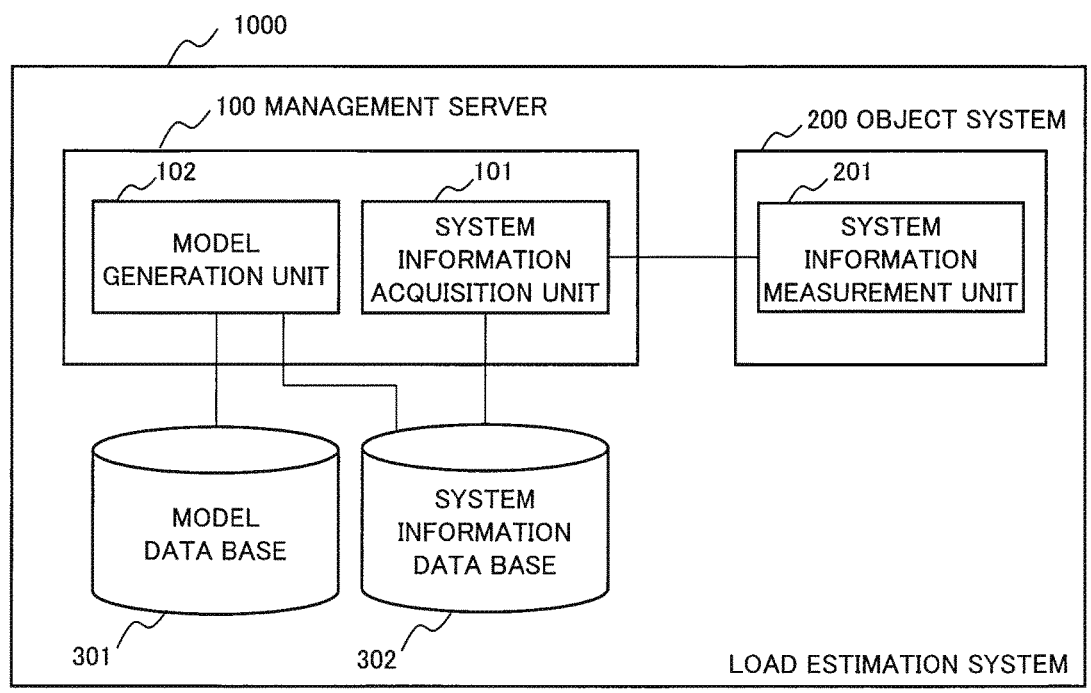
FIG. 1 is a block diagram illustrating an example of a configuration of a load estimation system according to a first exemplary embodiment of the present invention.

FIG. 1 is a block diagram illustrating an example of a configuration of a load estimation system according to a first exemplary embodiment of the present invention.

Referring to FIG. 1, a load estimation system 1000 according to the first exemplary embodiment of the present invention includes a management server 100, an object system 200, a model data base 301, and a system information data base 302. The object system 200 includes a system information measurement unit 201 that measures a load of the own object system and outputs load information and request information. The load information will be described later using FIG. 3, and the request information will be described later using FIG. 4. The management server 100 includes a system information acquisition unit 101 and a model generation unit 102.

The system information acquisition unit 101 collects load information and request information for the object system 200 from the system information measurement unit 201, and stores the load information and the request information in the system information data base 302. For example, the system information acquisition unit 101 periodically searches the object system 200, acquires load information and request information therefrom via the system information measurement unit 201, and stores the load information and the request information in the system information data base 302.

The model generation unit 102 acquires the load information and the request information for the object system 200 from the system information data base 302, and generates estimation distribution information about the load information for a classification of request and a request load model of the object system 200, on the basis of these pieces of information. Further, the model generation unit 102 stores the generated request load model and the estimation distribution information in the model data base 301. The estimation distribution information and the classification of request will be described later.

The system information acquisition unit 101, the model generation unit 102, and the system information measurement unit 201 are constituted by hardware, such as a logic circuit.

The model data base 301 and the system information data base 302 are storages, such as a disk device or a semiconductor memory.

The system information acquisition unit 101 and the model generation unit 102 may be functions that a processor of the management server 100 being a computer implements by executing a program in an unillustrated memory.

The system information measurement unit 201 may be a function that a processor of the object system 200 being a computer implements by executing a program in an unillustrated memory.

Figure 2:
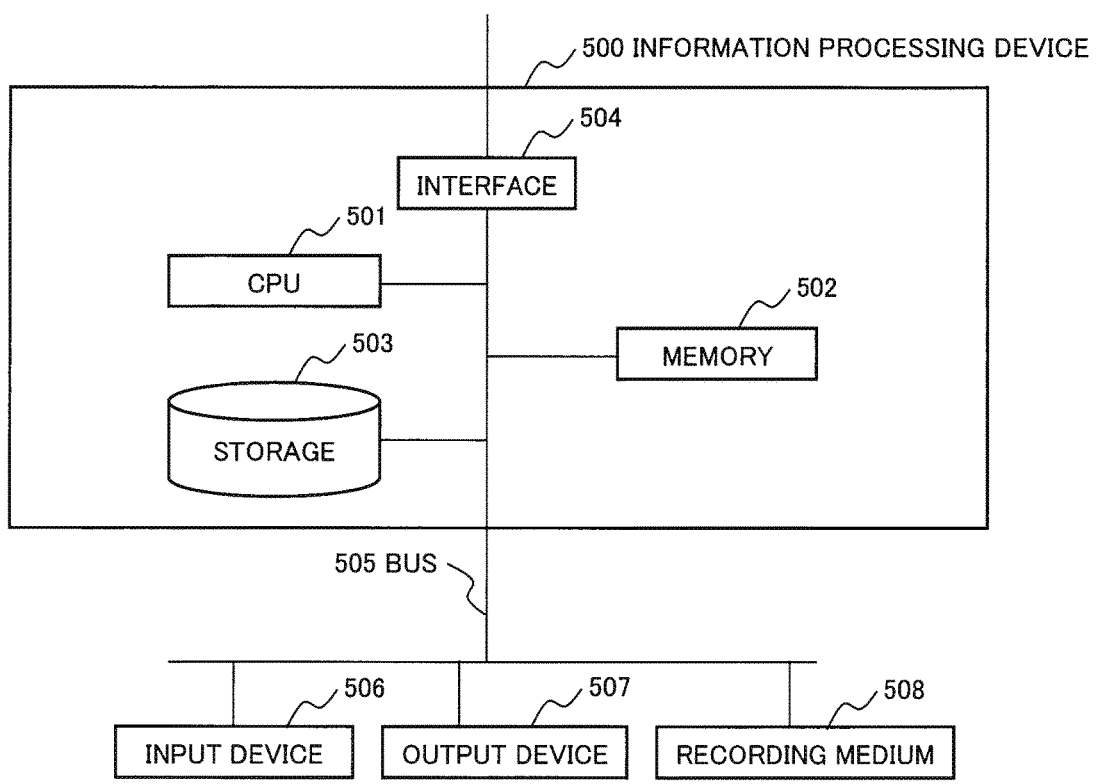
FIG. 2 is a block diagram illustrating a hardware circuit implementing a management server by a computer device according to the first exemplary embodiment of the present invention.

FIG. 2 is a block diagram illustrating a hardware circuit implementing the management server 100 by an information processing device 500 being a computer device according to the first exemplary embodiment of the present invention. It is assumed that the object system 200 also has the same configuration as the management server 100.

As illustrated in FIG. 2, the information processing device 500 includes a Central Processor Unit (CPU) 501, a memory 502, a storage 503 such as a hard disk, and a network connection interface 504. The information processing device 500 is connected to an input device 506 and an output device 507 via a bus 505. The interface 504 corresponds to a part of the system information acquisition unit 101 in FIG. 1.

The CPU 501 controls the overall information processing device 500 by operating an operating system. The CPU 501 reads out a program or data into the memory 502 from a recording medium 508 that is attached to, for example, a drive device. The CPU 501 functions as a part of the model generation unit 102 and as a part of the system information acquisition unit 101 according to the first exemplary embodiment, and executes various processing on the basis of a program. The CPU 501 may be configured by a plurality of CPUs.

The storage 503 is, for example, an optical disk, a flexible disk, a magneto-optical disk, an external hard disk, or a semiconductor memory or the like. The recording medium 508 is a non-volatile storage, and records therein a program to be executed by the CPU 501. The recording medium 508 may be a part of the storage 503. A program may be downloaded via the interface 504 from an unillustrated external computer that is connected to a communication network.

The input device 506 is implemented by, for example, a mouse, a keyboard, or a built-in keybutton so on, and is used for input operation. The input device 506 is not limited to a mouse, a keyboard, or a built-in keybutton. The input device 506 may be, for example, a touch panel. The output device 507 is implemented by, for example, a display, and is used for confirming output.

As described above, the management server 100 according to the first exemplary embodiment illustrated in FIG. 1 is implemented by the hardware configuration illustrated in FIG. 2. Nonetheless, the information processing device 500 in FIG. 2 is not limited to the configuration in FIG. 2. For example, the input device 506 and the output device 507 may be externally attached via the interface 504.

The information processing device 500 may be implemented by a physically linked single device, or may be implemented by a plurality of devices that are physically separated two or more devices being wiredly or wirelessly connected.

FIG. 3 is a diagram to exemplify load information for the object system 200 to be stored in the system information data base 302. In FIG. 3, load information refers to a resource amount consumed by the object system 200, and an average measurement value for each fixed period is recorded as the load information. In the case of FIG. 3, the resource amount is an average CPU utilization ratio (%) and an average memory usage (MB (MegaByte)). The load information for the object system 200 is measured by the system information measurement unit 201 on the basis of a type of the system for each virtual server unit, for each physical server unit, or for each of the plurality of units. For example, in a virtual environment, a CPU utilization ratio may be measured for each virtual machine, or for each physical machine.

The average CPU utilization ratio and the average memory usage are taken as examples for load information herein. However, any index that is a load-measurable resource amount or load value may be used other than these examples.

FIG. 4 is a diagram to exemplify request information for the object system 200 to be stored in the system information data base 302. The request information includes a request received from the object system 200, a date and time of reception of the request (for example, 8/20 (August 20) 0:01), and a classification for the request (also referred to as a "classification of request"). The request is information generated when the object system 200 performs data processing, and includes, for example, "GET/func1/a.html" and "GET/func2/a.html". It is assumed that, at an initial state of classification of request, all requests belong to the same classification of request ("Classification 1"), as illustrated in FIG. 4.

Next, description is given for the generation of estimation distribution information about load information for the object system 200, the estimation distribution information being generated by the model generation unit 102 for each classification of request. Firstly, the model generation unit 102 reads out request information and load information from the system information data base 302, and calculates load estimation distribution information for each classification of request (hereinafter, simply referred to as a "classification"). The estimation distribution information for each classification is information relating to load distribution per classification of request. The estimation distribution information for each classification may be a specific distribution function, or may be other distribution information based on a statistical amount. In the present exemplary embodiment, the estimation distribution information for each classification is treated as a Gaussian distribution. In this case, the generation of the estimation distribution information also corresponds to the estimation of parameters in a single Gaussian distribution. A method of parameter estimation by the model generation unit 102 may be a known method, such as the maximum likelihood estimation or the Bayesian inference.

Figures 5, 6:
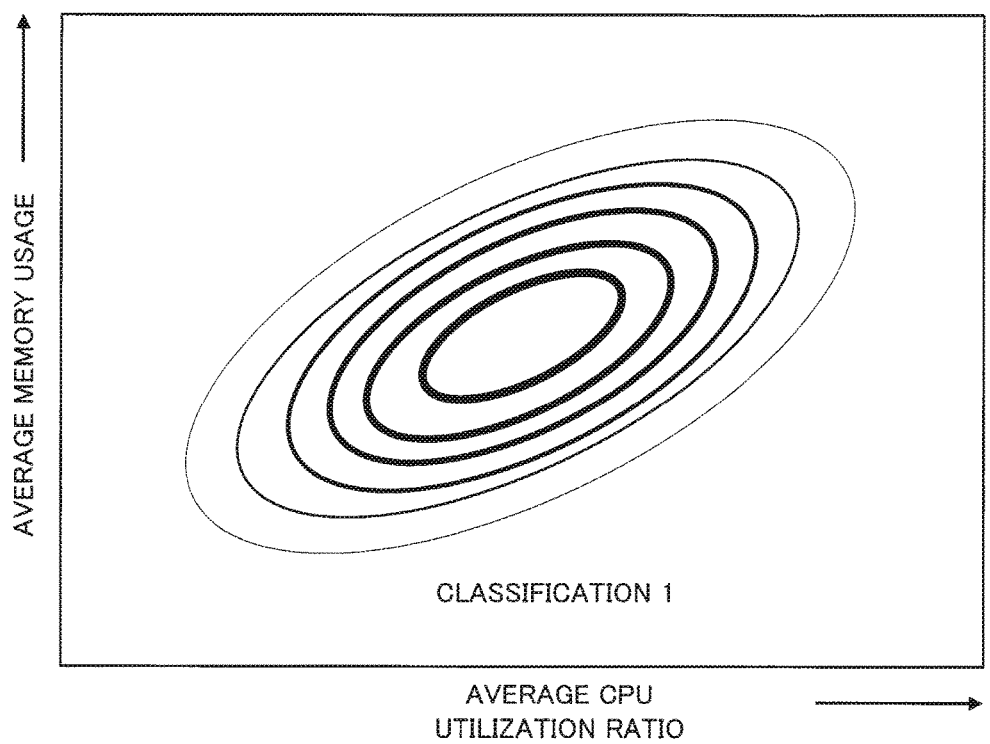
FIG. 5 is a diagram illustrating an example of estimation distribution information for "Classification 1" according to the first exemplary embodiment of the present invention.
FIG. 6 is a diagram illustrating an example of a result of classification of request information in applying a two-class classification rule to "Classification 1".

FIG. 5 is a diagram illustrating an example of estimation distribution information for "Classification 1". In FIG. 5, the horizontal axis represents the average CPU utilization ratio, the vertical axis represents the average memory usage, and contour lines represent the density of distribution. In this manner, the estimation distribution information for each classification is data that is calculated using standard deviation for the load values within the classification as calculable distribution or statistical information. The estimation distribution information for each classification is stored in the model data base 301 by the model generation unit 102.

Next, the model generation unit 102 generates a request load model by hierarchically sub-classifying the request information. Firstly, the model generation unit 102 selects a classification to be sub-classified using a standard deviation that is calculated from the estimation distribution information for each classification (distribution illustrated in FIG. 5) as reference. Since no classification except for "Classification 1" is present at the initial state, the model generation unit 102 selects "Classification 1" as an object for sub-classification. Next, the model generation unit 102 sub-classifies the selected classification. Examples of a method of sub-classification include two-class classification according to the presence/absence of a keyword included in request information. However, any method can be used herein. In the present exemplary embodiment, it is assumed that two-class classification according to the presence/absence of a keyword is used as a method of sub-classification for illustrative purpose.

FIG. 6 is a diagram illustrating data representing a result of classification of request in applying a two-class classification rule according to the presence/absence of the keyword "func1" to "Classification 1". The data representing a result of classification is classification information that is stored in the model data base 301, or in the memory 502 or the storage 503 of the information processing device 500 in FIG. 2.

In the case of two-class classification according to the presence/absence of a keyword, classification rules are present corresponding to the number of keywords. For a keyword, a character string obtained in dividing a request in request information by a proper delimiter is used. The model generation unit 102 applies classification rules one by one to the classification being an object for sub-classification, and then evaluates each of the classification rules. The application here is tentative, and the model generation unit 102 returns the classification to the original at a point in time of finishing one evaluation.

Evaluating the classification applied with one classification rule refers to evaluating a regression equation for finding load information using the number of requests for each classification on the basis of a classification evaluation criterion.

The model generation unit 102 models the load information by using the classification information applied with one classification rule, and uses, as a classification evaluation criterion, a regression error or a test error in the modeling. When using a test error as an evaluation criterion, the model generation unit 102 utilizes a part of the data (load information and request information) stored in the system information data base 302 as data for learning, and utilizes another part of the data as test data for evaluation. When utilizing a regression error, the model generation unit 102 uses all the data stored in the system information data base 302 as data for learning. The model generation unit 102 determines that the smaller a value (evaluation value) of a regression error or a test error in the regression is, the higher an evaluation for a classification rule is.

Figures 7, 8:
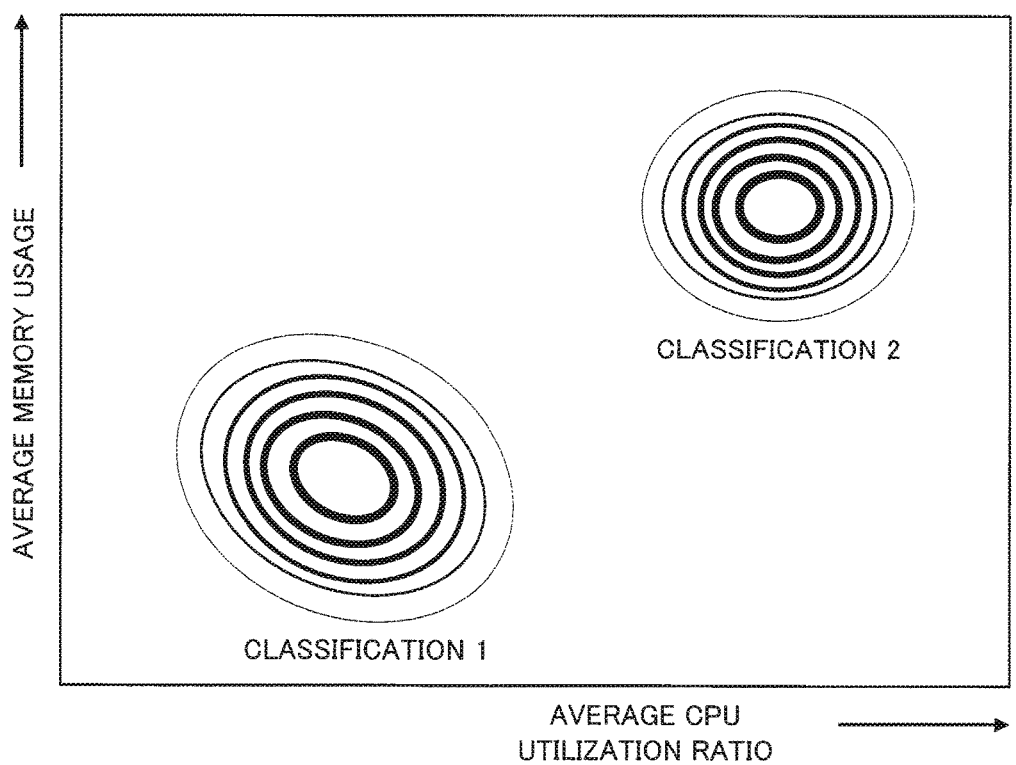
FIG. 7 is a diagram illustrating a regression equation for finding load information using the number of requests for each classification according to the first exemplary embodiment of the present invention.
FIG. 8 is a diagram illustrating an example of estimation distribution information for "Classification 1" and "Classification 2".

FIG. 7 illustrates an example of a request load model, being a mathematical expression indicating an example of a regression equation for the model generation unit 102 to predict a load of a request. The request load model illustrated in FIG. 7 is obtained by correlating load information for an object system using a classification of request into which request information for the object system is classified. In expression (1) illustrated in FIG. 7, $U_i$ indicates load information for a system measured during an i-th (i= 1, 2, 3, . . . , p) measurement period, and $W_k$ indicates a load value (for example, an average CPU utilization ratio and an average memory usage) of a k-th (k=1, 2, 3, . . . , q) classification of request (when assuming that requests are classified into q kinds). $Ni_k$ indicates the number of requests for classification k of request measured during an i-th measurement period.

The load information for the object system 200 represents an average value for a fixed period, and thus, is not in direct association with the individual requests. Thus, a sum total value of loads obtained when a plurality of requests are executed on the system is recorded as load information for the system in the model data base 301.

The load information for the system being a sum total value is separable into individual request units. In this case, the model generation unit 102 may find the load value $W_k$ by solving an equation of, for example, expression (1) in FIG. 7.

In the present exemplary embodiment, any model (method) other than the linear regression model described above as an example of a request load model may be used for evaluation. Since a classification of request is not explicitly given in general, the load estimation system 1000 according to the present exemplary embodiment carries out classification of request information together with estimation of a load value for each classification of request (by solving an equation of expression (1)).

Figure 9:
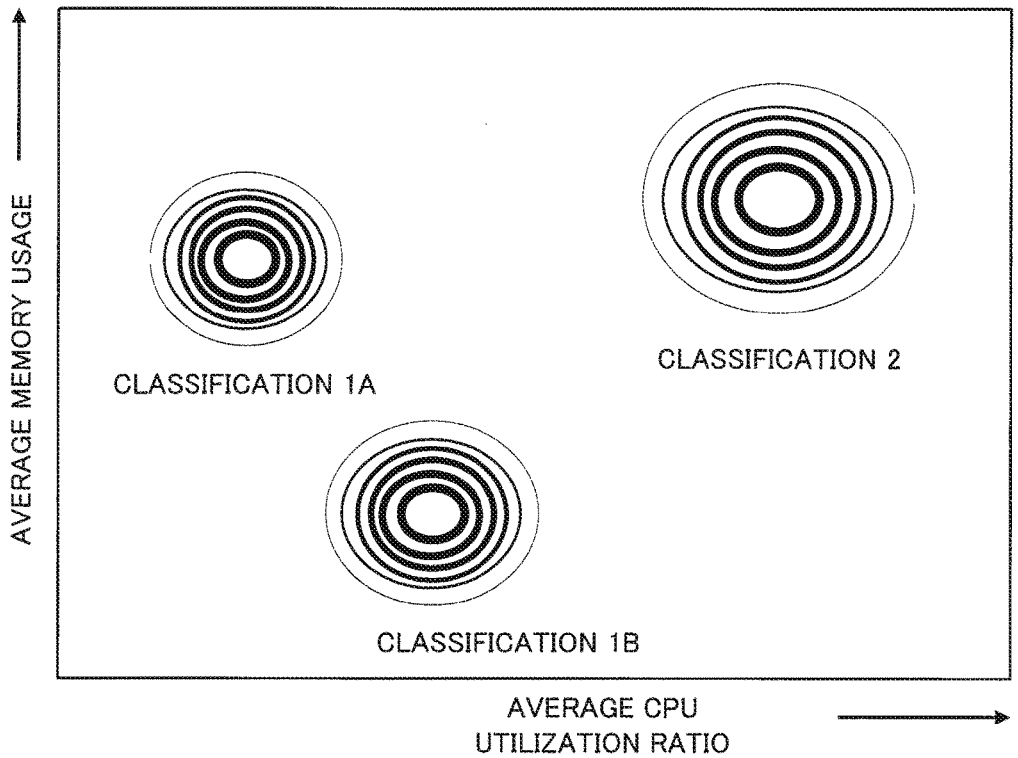
FIG. 9 is a diagram illustrating an example of estimation distribution information for "Classification 1", "Classification 2" and "Classification 3".

FIGS. 8 and 9 are each a diagram illustrating an example of estimation distribution information when a classification has been sub-classified.

Addition of a classification is performed by applying a classification rule to any one of already existing classifications and sub-classifying the classification, for example, as illustrated in FIG. 6. As classification progresses, the number of classifications increases. Consequently, a method of efficiently determining (or selecting) a classification to be sub-classified next is important. For example, when requests are classified into ten kinds, ten kinds of objects for sub-classification are present.

The model generation unit 102 selects, in a process of the classification of the request information, a classification to be an object for sub-classification on the basis of estimation distribution information for each classification. With this configuration, the model generation unit 102 achieves efficient classification. If no criterion for selecting a classification to be an object for sub-classification is present as in PTLs 1 and 2 described above, evaluation is to be performed in a brute-force manner including classifications with small influence on a load, and thus, this is inefficient.

The estimation distribution information for each classification is calculated using standard deviation for the load values within the classification as calculable distribution or statistical information, in a same manner as in FIG. 5.

As described above, the model generation unit 102 firstly selects a classification to be sub-classified on the basis of the estimation distribution information for each of the current classifications. The model generation unit 102 uses, as one criterion for selecting a classification, a standard deviation that is calculated from the estimation distribution information for each classification. A classification with a larger standard deviation may include mixture of requests having different load values with high possibility, and hence the classification with a larger standard deviation is suitable as an object for sub-classification.

When a plurality of classifications are present, the model generation unit 102 selects the classification having the largest standard deviate from among the classifications, and further, carries out sub-classification on the selected classification. In the case of the example illustrated in FIG. 8, since "Classification 1" has a large standard deviation, the model generation unit 102 selects "Classification 1" as an object for sub-classification, and repeats the steps similar to the above-described classification. As illustrated in FIG. 9, when "Classification 1" is sub-classified into "Classification 1A" and "Classification 1B", the model generation unit 102 again calculates estimation distribution information for respective Classifications 1A and 1B.

As for a method of classification itself, the model generation unit 102 utilizes an existing method, for example, a method of two-class classification according to whether a certain keyword is included (see FIG. 6). In classification, the model generation unit 102 applies preliminarily prepared classification rules one by one to the classification being an object for sub-classification, and further, evaluates, for example, a regression equation for finding load information using the number of requests for each classification on the basis of a classification evaluation criterion.

The model generation unit 102 updates the classification information by finally applying the classification rule having a highest evaluation value of a plurality of classification rules that obtain, as a result of the evaluation, an evaluation value higher than the value before the application of each classification rule. When the classification information is updated by the sub-classification, the model generation unit 102 again calculates estimation distribution information for each classification. The model generation unit 102 selects the classification having the largest standard deviate that is calculated from the estimation distribution information for each classification, and further, carries out sub-classification on the selected classification. When no more error (evaluation value being a value of either a regression error or a test error) is improved even by applying any of the classification rules, the model generation unit 102 does not carry out sub-classification and ends the processing.

In this manner, the model generation unit 102 repeats the selection of a classification to be an object for sub-classification and the sub-classification thereof, and ends the sub-classification at a point in time when no more error that is obtained from a request load model used in evaluating classification rules is improved compared to before the application of any classification rule. In other words, the model generation unit 102 performs the above-described classification evaluation on all classification rules, and ends the classification while applying the classification rule having a highest evaluation as the final classification rule.

The estimation distribution information for a classification is obtained by reflecting a load characteristic of a request, and is also available in evaluating the reliability (accuracy) of a predicted value in predicting a load of a request. For example, when obtaining a high value of standard deviation from estimation distribution information for a classification into which a request to be predicted is classified, the model generation unit 102 can determine that the reliability of a predicted load value to be calculated using a request load model is low.

As stated above, the model generation unit 102 selects a classification to be an object for sub-classification on the basis of estimation distribution information for each classification of request, and thus, enables to efficiently construct a request load model in which request information and load information for a system are correlated with each other.

Next, the overall operation of the load estimation system 1000 according to the present exemplary embodiment is described in detail with reference to flowcharts illustrated in FIGS. 10 and 11.

Figure 10:
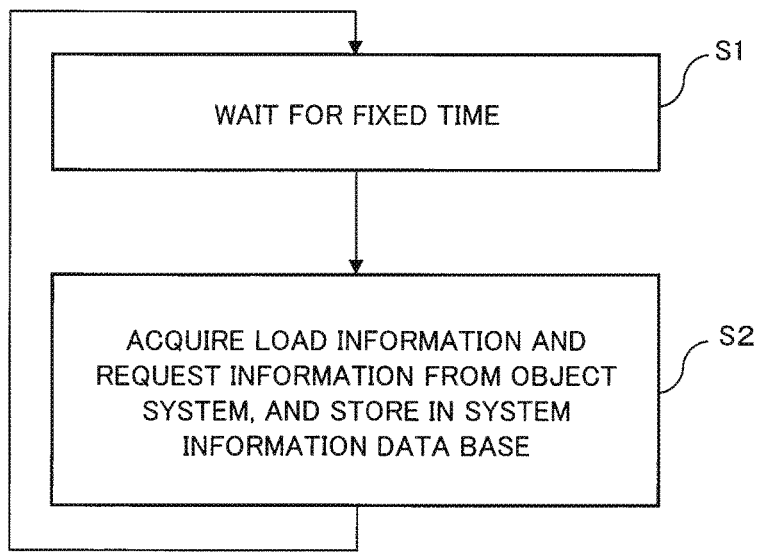
FIG. 10 is a flowchart illustrating an operation of a system information acquisition unit according to the first exemplary embodiment of the present invention.

FIG. 10 is a flowchart illustrating an operation of the system information acquisition unit 101 according to the first exemplary embodiment of the present invention.

Referring to FIG. 10, the system information acquisition unit 101 waits for a fixed time (S1). After an elapse of the fixed time, the system information acquisition unit 101 acquires load information and request information from the system information measurement unit 201 of the object system 200, and stores the load information and the request information in the system information data base 302 (S2). The system information acquisition unit 101 repeats the processing of S1 and S2 for each fixed time until the system stops.

Figure 11:
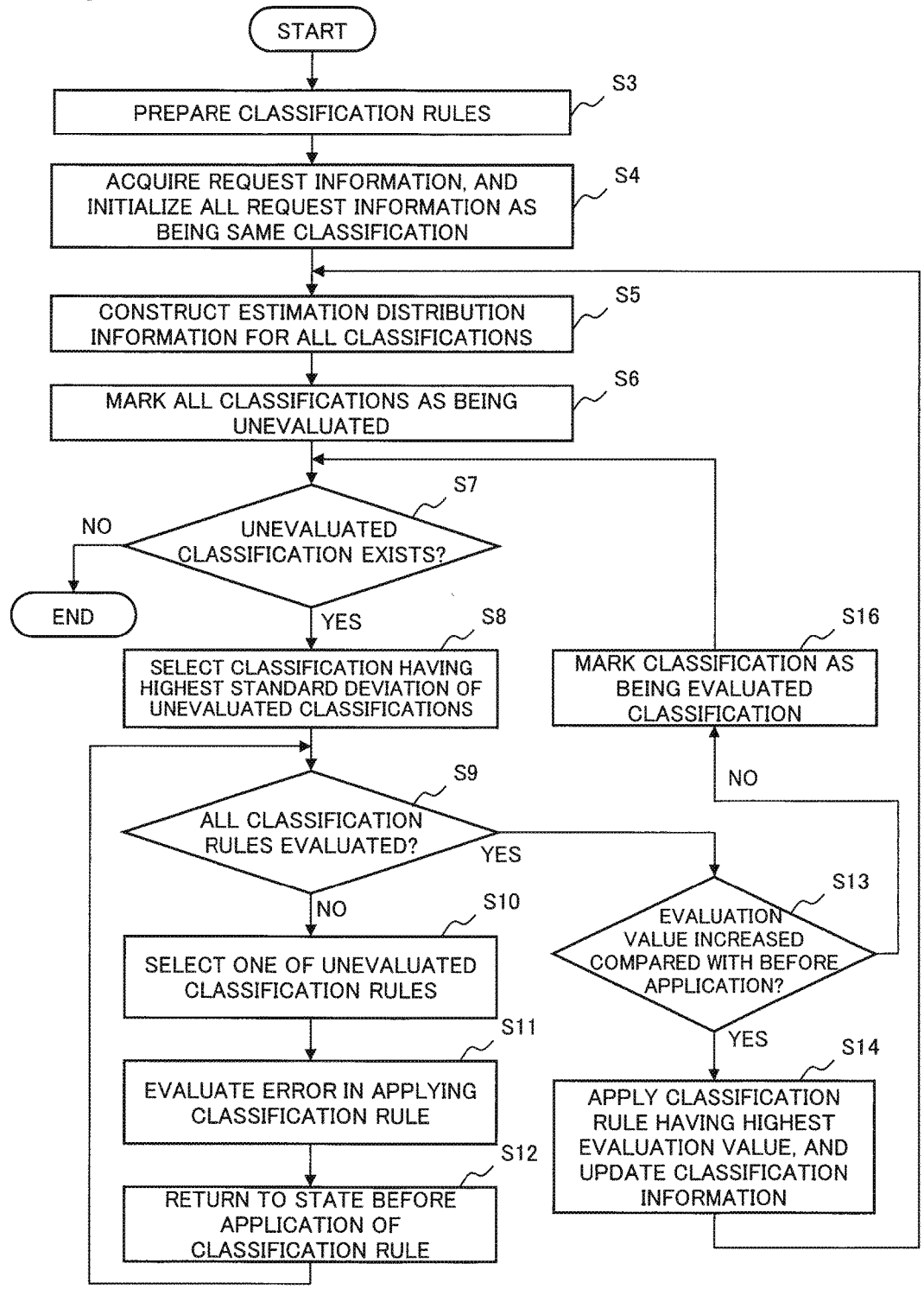
FIG. 11 is a flowchart illustrating an operation of a model generation unit according to the first exemplary embodiment of the present invention.

FIG. 11 is a flowchart illustrating an operation of classification of request by the model generation unit 102 according to the first exemplary embodiment of the present invention.

Referring to FIG. 11, the model generation unit 102 firstly prepares classification rules (S3). Next, the model generation unit 102 acquires the request information from the system information data base 302, and initializes all the acquired request information as being the same classification (S4).

The model generation unit 102 generates estimation distribution information for each classification, and constructs the estimation distribution information for all the classifications (S5). The model generation unit 102 marks all the classifications as being unevaluated classifications (S6). "Mark" refers to, for example, assigning a predetermined flag.

The model generation unit 102 determines whether there exists an unevaluated classification (S7). When "Yes" at S7, the model generation unit 102 calculates a standard deviation from the estimation distribution information that is calculated from each of all the unevaluated classifications, and selects the classification having a highest standard deviate as being the classification to be an object for sub-classification (S8). When there exists no unevaluated classification ("No" at S7), the model generation unit 102 ends the processing (S15).

The model generation unit 102 applies the classification rules one by one to the selected unevaluated classification and evaluates each of the classification rules. Specifically, the model generation unit 102 determines whether the model generation unit 102 has evaluated all the classification rules for the selected classification (S9). When having not evaluated all the classification rules, the model generation unit 102 selects one of the unevaluated classification rules and applies the classification rule to the selected classification (S10). Next, the model generation unit 102 evaluates an error in applying the classification rule using a request load model (S11). The model generation unit 102 stores an evaluation value obtained as a result of the evaluation in the memory 502 in FIG. 2, and thereafter returns the classification to a state before the application of the classification rule (S12). The model generation unit 102 applies another one of the classification rules to the selected unevaluated classification, and repeats S9 to S12.

When evaluation for the classification rules is completed ("Yes" at S9) and the evaluation value has increased compared with that before the application of the classification rule ("Yes" at S13), the model generation unit 102 applies the classification rule having a highest evaluation value of the evaluation values stored in the memory 502, and updates classification information (S14).

Subsequently, the processing of the model generation unit 102 returns to S5, and the model generation unit 102 again repeats the steps for sub-classification (S5 to S9).

When evaluation for the classification rules is completed and there is no classification rule having the evaluation value that has increased compared with that before the application of the classification rule ("No" at S13), the model generation unit 102 marks the classification having the evaluation value that has not increased as being an evaluated classification (S16), and determines whether to evaluate an unevaluated classification (S7) again.

The load estimation system 1000 according to the present exemplary embodiment has the following effect.

The load estimation system 1000 enables to efficiently construct a request load model that enables estimation of load information for a system on the basis of request information.

The reason is that the load estimation system 1000 selects an object for sub-classification on the basis of estimation distribution information for each classification of request.

<Second Embodiment>

Next, a second exemplary embodiment of the present invention is described in detail with reference to the drawings.

Figure 12:
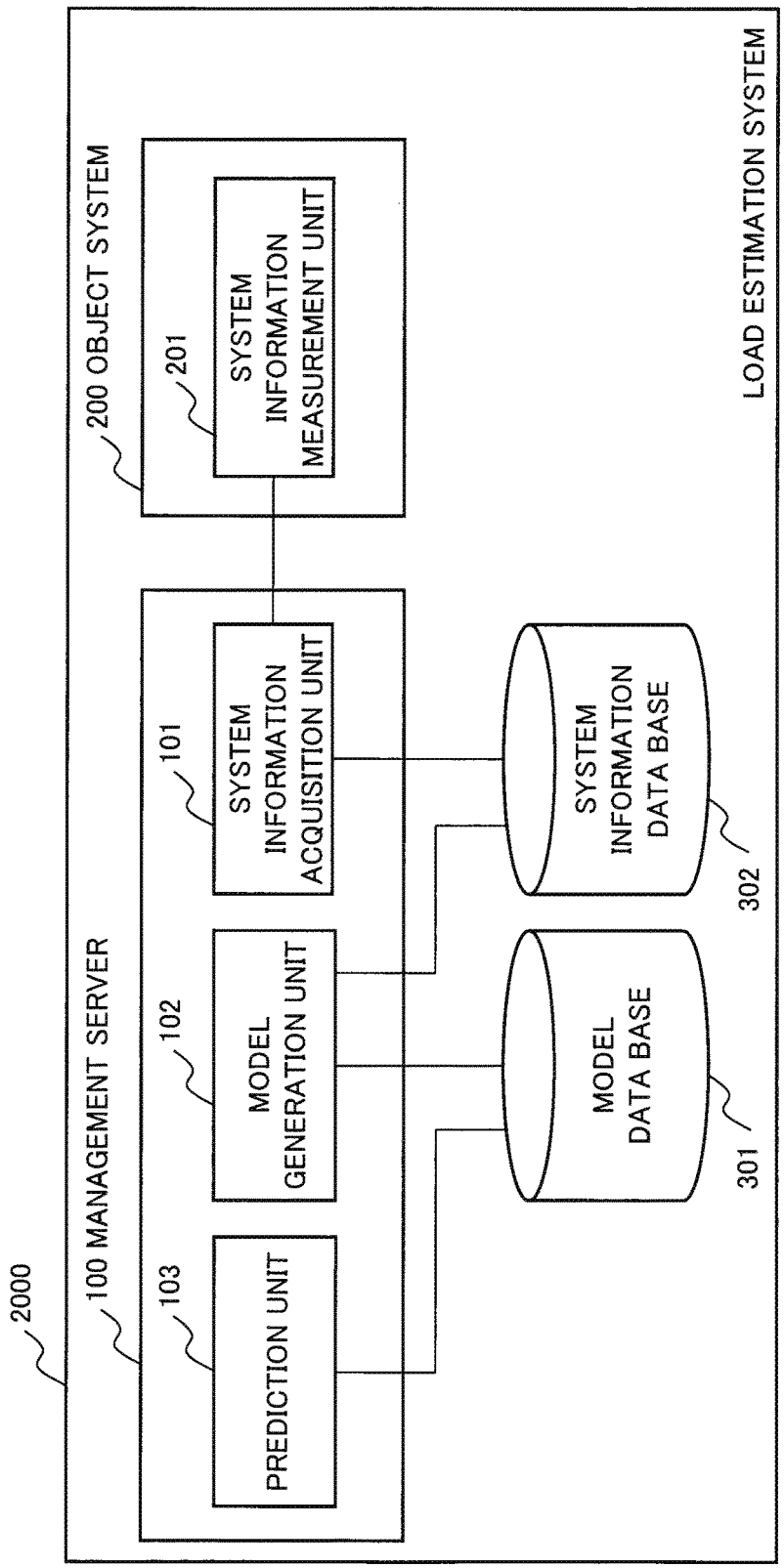
FIG. 12 is a block diagram illustrating an example of a configuration of a load estimation system according to a second exemplary embodiment of the present invention.

FIG. 12 is a block diagram illustrating an example of a configuration of a load estimation system 2000 according to the second exemplary embodiment of the present invention.

Referring to FIG. 12, a management server 100 in the second exemplary embodiment includes a prediction unit 103 additionally to the configuration of the first exemplary embodiment.

The present exemplary embodiment is the same as the first exemplary embodiment in that the management server 100 acquires load information and request information from an object system 200, generates a request load model and estimation distribution information, and stores the request load model and the estimation distribution information in a model data base 301.

The prediction unit 103 accepts an input relating to request information, and predicts a load at a time when a request included in the request information concerned is executed by the object system 200.

Firstly, the prediction unit 103 acquires a request load model and estimation distribution information for the object system 200 from the model data base 301.

The prediction unit 103 determines which classification of request the request information belongs to, and predicts a load value using the request load model for the classification of request concerned. At this time, the prediction unit 103 may use the estimation distribution information for the classification concerned to output data on the reliability of the predicted load value (for example, a value of standard deviation of the estimation distribution information) at the same time.

The prediction unit 103 is configured by hardware such as a logic circuit.

The prediction unit 103 may be implemented by executing, by a processor of the management server 100 being a computer, a program in an unillustrated memory.

The load estimation system 2000 according to the present exemplary embodiment has the following effect.

The load estimation system 2000 enables to predict a load at a time when a request is executed by the object system 200.

The reason is that the load estimation system 2000 uses a request load model and estimation distribution information for the object system 200 acquired from the model data base 301.

<Third Embodiment>

Next, a third exemplary embodiment of the present invention is described in detail with reference to the drawings.

Figure 13:
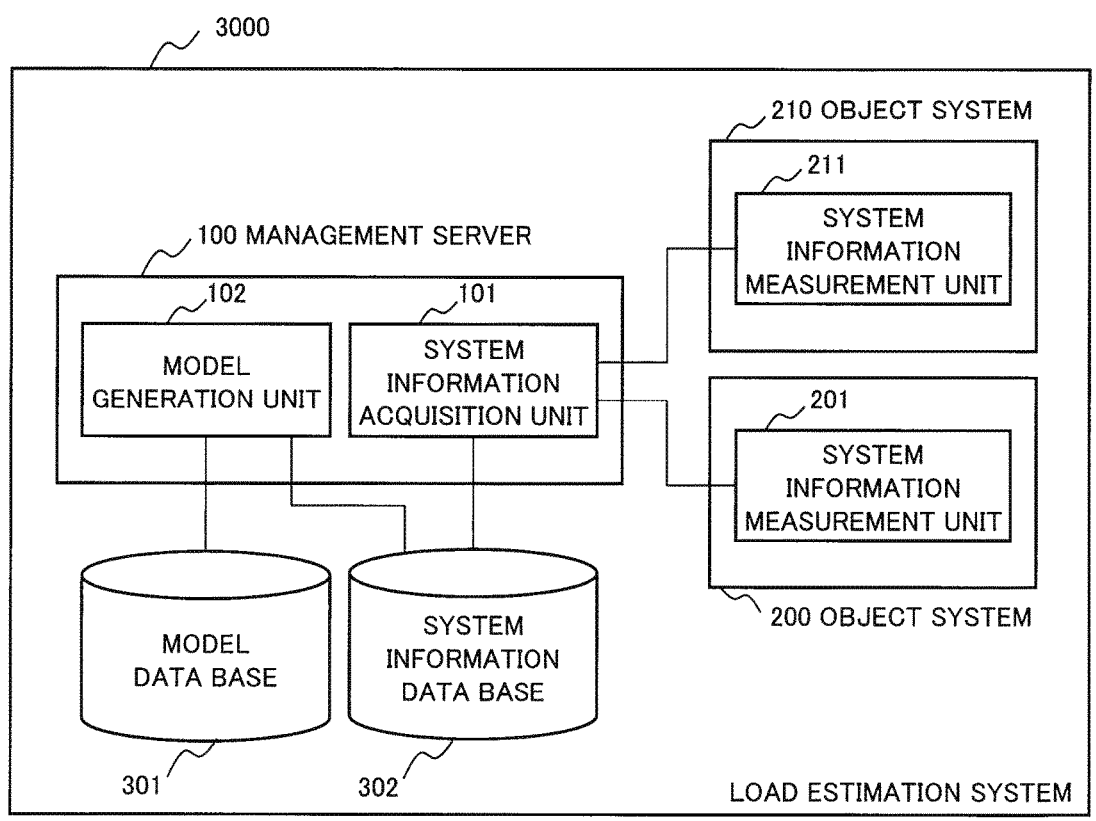
FIG. 13 is a block diagram illustrating an example of a configuration of a load estimation system according to a third exemplary embodiment of the present invention.

FIG. 13 is a block diagram illustrating an example of a configuration of a load estimation system 3000 according to the third exemplary embodiment of the present invention.

Referring to FIG. 13, the configuration of the third exemplary embodiment includes a plurality of object systems existing in the configuration of the first exemplary embodiment. Herein, the case where there exist two object systems is described. However, the case where there exist three or more object systems is also the same.

A system information acquisition unit 101 collects load information and request information from object systems 200 and 210 via system information measurement units 201 and 211, and stores the load information and the request information in a system information data base 302. A model generation unit 102 acquires the load information and the request information from the system information data base 302, and constructs a request load model for each object system. However, the model generation unit 102 may generate a request load model using, as request information, request information for another object system.

With this configuration, when, for example, one of the object systems is a Web server and another one of the object systems is an application server, the model generation unit 102 is capable of generating a request load model in which request information for the Web server and load information for the application server are in association with each other.

In the present exemplary embodiment, the prediction unit 103 indicated in the second exemplary embodiment described above may be applied to the load estimation system 3000 according to the present exemplary embodiment.

The load estimation system 3000 according to the present exemplary embodiment has the following effect.

The load estimation system 3000 enables to efficiently construct a request load model that enables estimation of load information for a system on the basis of request information.

The reason is that the load estimation system 3000 selects an object for sub-classification on the basis of estimation distribution information for each classification of request.

<Fourth Embodiment>

Next, a fourth exemplary embodiment of the present invention is described in detail with reference to the drawings.

Figure 14:
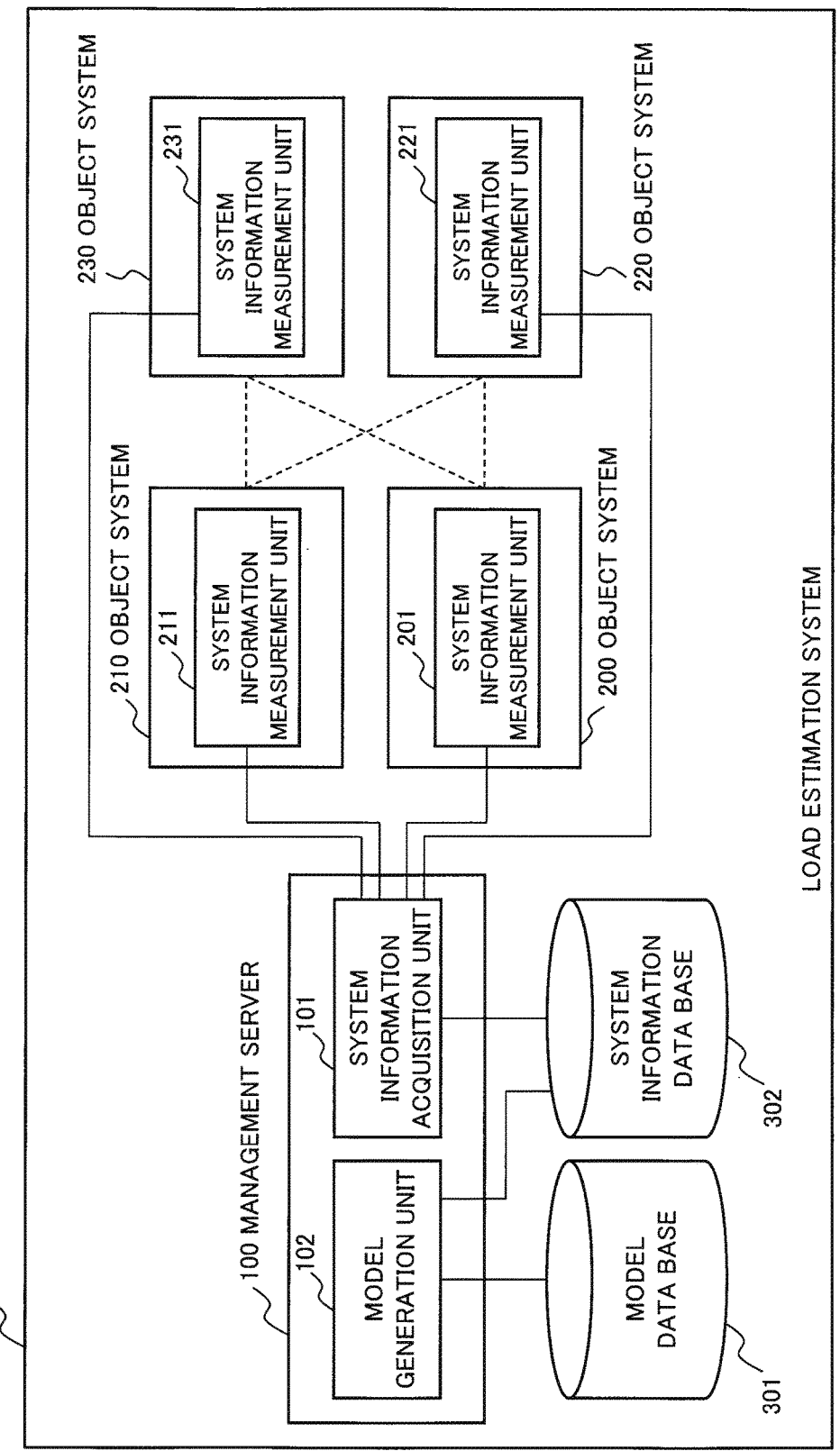
FIG. 14 is a block diagram illustrating an example of a configuration of a load estimation system according to a fourth exemplary embodiment of the present invention.

FIG. 14 is a block diagram illustrating an example of a configuration of a load estimation system 4000 according to the fourth exemplary embodiment of the present invention.

Referring to FIG. 14, the configuration of the fourth exemplary embodiment is the same as the configuration of the third exemplary embodiment, and further, defines a flow of processing between object systems. A flow is indicated by a dotted line between the object systems. Nonetheless, the configuration and the flow of the object systems are not limited to those in FIG. 14. The flow of processing includes four flows, namely, from an object system 200 to an object system 220, from the object system 200 to an object system 230, from an object system 210 to the object system 220, and from the object system 210 to the object system 230.

Definition is given as follows, for example: The object systems 200 and 210 are pre-object systems. The object systems 220 and 230 are post-object systems.

A system information acquisition unit 101 collects load information and request information from the object systems 200, 210, 220, and 230 via system information measurement units 201, 211, 221, and 231, and stores the load information and the request information in a system information data base 302.

The model generation unit 102 acquires the load information and the request information from the system information data base 302, and constructs a request load model for each object system. The model generation unit 102 constructs a request load model for the pre-object system using the load information and the request information for the own object system.

In contrast to this, in order to construct a request load model for the post-object system, the model generation unit 102 creates integrated request information integrating the request information for all the pre-object systems, and further creates integrated load information adding up and integrating the load information for all the post-object systems. The model generation unit 102 uses the integrated request information and the integrated load information to construct a request load model, making this as a request load model for the post-object system. When, for example, there exist a plurality of Web servers and a plurality of application servers, this configuration is advantageous in the case of constructing a request load model for an application server in association with request information for a Web server.

The prediction unit 103 indicated in the second exemplary embodiment described above may be applied to the load estimation system according to the present exemplary embodiment.

The load estimation system 4000 according to the present exemplary embodiment has the following effect.

The load estimation system 4000 enables to efficiently construct a request load model that enables estimation of load information for a system on the basis of request information.

The reason is that the load estimation system 4000 selects an object for sub-classification on the basis of estimation distribution information for each classification of request.

<Fifth Embodiment>

Next, a fifth exemplary embodiment of the present invention is described in detail with reference to the drawings.

Figure 15:
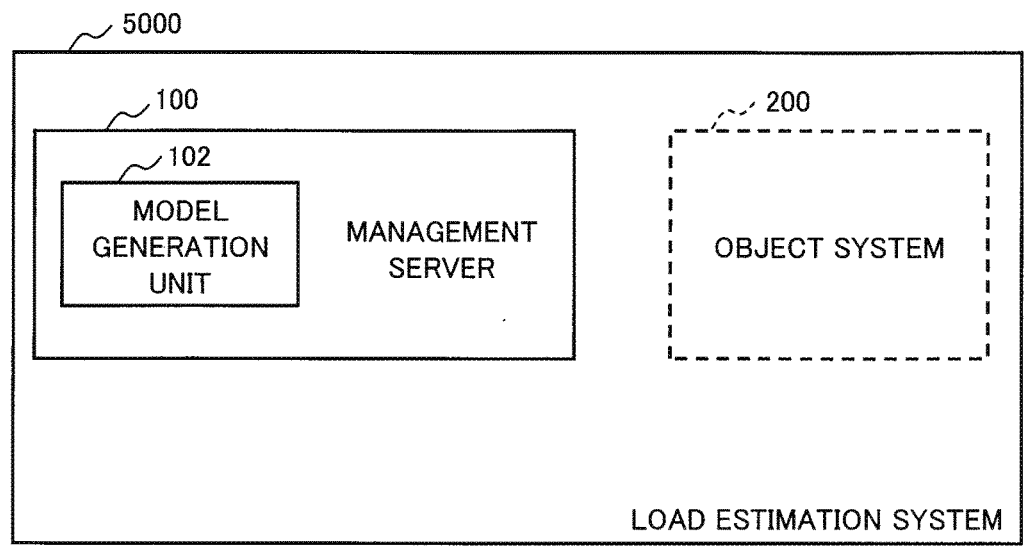
FIG. 15 is a block diagram illustrating an example of a configuration of a load estimation system according to a fifth exemplary embodiment of the present invention.

FIG. 15 is a block diagram illustrating an example of a configuration of a load estimation system 5000 according to the fifth exemplary embodiment. In FIG. 15, solid line block portions correspond to the basic structure of the load estimation system according to each of the first to fourth exemplary embodiments.

The load estimation system 5000 includes a management server 100. In FIG. 15, the load estimation system 5000 includes an object system 200 in addition to the management server 100. However, the object system 200 may be a device that is externally connected to the load estimation system.

The management server 100 includes a model generation unit 102 that generates a request load model that correlates load information for the object system 200 using a classification of request into which request information for the object system 200 is classified.

The model generation unit 102 selects, in a process of the classification of the request information, a classification of request to be an object for sub-classification on the basis of estimation distribution information about the load information for each classification of request.

The load estimation system 5000 according to the present exemplary embodiment has the following effect.

The load estimation system 5000 enables to efficiently construct a request load model that enables estimation of load information for a system on the basis of request information.

The reason is that the load estimation system 5000 selects an object for sub-classification on the basis of estimation distribution information for each classification of request.

<Sixth Embodiment>

Next, a sixth exemplary embodiment of the present invention is described in detail with reference to the drawings.

Figure 16:
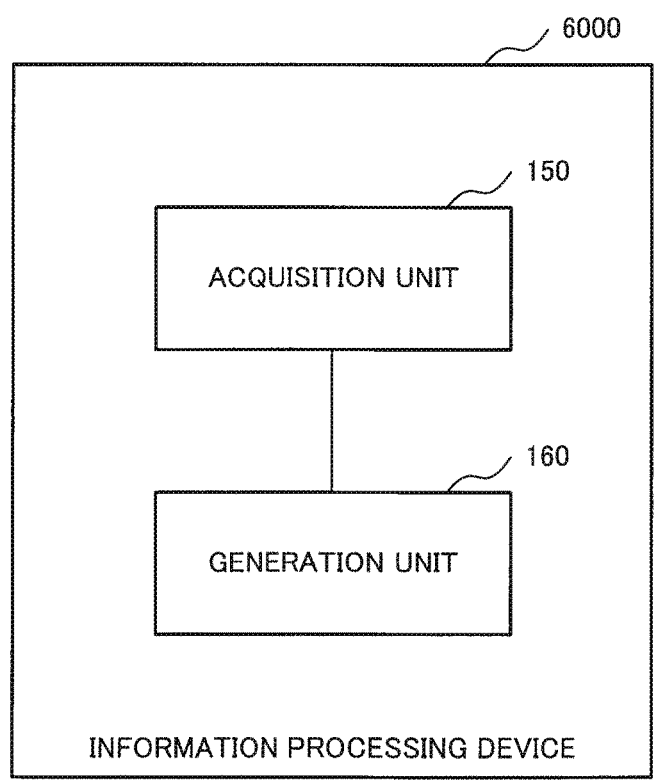
FIG. 16 is a block diagram illustrating an example of a configuration of an information processing device 6000 according to a sixth exemplary embodiment.

FIG. 16 is a block diagram illustrating an example of a configuration of an information processing device 6000 according to the sixth exemplary embodiment of the present invention.

The information processing device 6000 includes an acquisition unit 150 and a generation unit 160. The information processing device 6000 includes a function of estimating a load on an unillustrated external device.

The acquisition unit 150 acquires a classification of request information from an external device and load information for the unillustrated external device that corresponds to the request information.

The generation unit 160 generates a distribution of load information for each classification of request information on the basis of the acquired load information. The generation unit 160 divides a classification of request information that corresponds to a distribution of load information in accordance with the distribution of load information.

The information processing device 6000 according to the present exemplary embodiment has the following effect.

The information processing device 6000 enables to efficiently construct a request load model that enables estimation of load information for a system on the basis of request information.

The reason is that the generation unit 160 divides a classification of request information that corresponds to a distribution of load information in accordance with the distribution of load information. With this configuration, the generation unit 160 achieves efficient classification. This eliminates the necessity of evaluation to be performed in a brute-force manner including a classification with small influence on a load when no criterion for selecting a classification to be an object for sub-classification is present as in PTLs 1 and 2 described above.

The present invention has been described using each of the exemplary embodiments described above as an exemplary example. However, the present invention is not limited to the above-described exemplary embodiments. In other words, various modes that a person skilled in the art can understand can be applied to the present invention within the scope of the present invention.

This application is based upon and claims the benefit of priority from Japanese Patent Application No. 2014-067602, filed on Mar. 28, 2014, the disclosure of which is incorporated herein in its entirety.

REFERENCE SIGNS LIST

1000 Load estimation system
100 Management server
101 System information acquisition unit
102 Model generation unit
103 Prediction unit
2000 Load estimation system
200, 210, 220, 230 Object system
201, 211, 221, 231 System information measurement unit
3000 Load estimation system
301 Model data base
302 System information data base
4000 Load estimation system
500 Information processing device
501 CPU
502 Memory
503 Storage
504 Interface
505 Bus
506 Input device
507 Output device
508 Recording medium
5000 Load estimation system
6000 Information processing device

The invention claimed is:

1. A management server that is connected to at least one object system, the management server comprising:
a memory configured to store instructions; and
a processor configured to process the instructions to:
generate a request load model in which load information for the object system is correlated with a classification of request into which request information for the object system is classified; and
select, in a process of the classification of the request information, the classification of request to be an object for sub-classification when a reference value that is calculated from estimation distribution information about the load information for each of the classification of request is equal to or greater than a fixed value.

2. The management server according to claim 1, wherein the estimation distribution information about the load information for each of the classification of request is a function or a statistical value that expresses a distribution of the load information for the classification of request, and is estimated from the load information for the object system and the classification of request.

3. The management server according to claim 1, wherein the processor is configured to evaluate a plurality of classification rules each applied to the classification of request being an object for the sub-classification, and to apply the classification rule having a highest evaluation value, which is an evaluation value higher than the value before an application of each classification rule, to the classification of request to be the object.

4. The management server according to claim 1, wherein the evaluation value is determined based on a value of either a regression error obtained when finding the load information for the object system by using a regression equation that is information relating to the classification of request, or a test error using the load information and the classification of request that are not used for learning in regression.

5. The management server according to claim 3, wherein the classification rules include a classification method of two-class classification depending on whether or not a character string is present in the request information, by using the character string extracted when dividing the request information by a proper delimiter.

6. The management server according to claim 1, wherein a standard deviate is used as the reference value.

7. The management server according to claim 1, wherein the processor is further configured to accept an input relating to request information, and predict, by using the request load model, the load at a time when a request included in the request information concerned is executed by the object system.

8. A load estimation method executed by a computer comprising:
generating a request load model that correlates load information for an object system by using a classification of request into which request information for the object system is classified; and
selecting, in a process of the classification of the request information, the classification of request to be an object for sub-classification, when a reference value that is calculated from estimation distribution information about the load information for each of the classification of request is equal to or greater than a fixed value.

9. A non-volatile recording medium capable of reading a program that causes a computer to execute:
processing to generate a request load model that correlates load information for an object system by using a classification of request into which request information for the object system is classified; and
processing to select, in a process of the classification of the request information, the classification of request to be an object for sub-classification, when a reference value that is calculated from estimation distribution information about the load information for each of the classification of request is equal to or greater than a fixed value.

* * * * *